United States Patent [19]
Hughes

[11] 3,869,441
[45] Mar. 4, 1975

[54] 3-SECONDARY AMINOMETHYLENE-4-LOWER-ALKYL-5-AZO-6-HYDROXYPYRID-2-ONE DYESTUFFS

[75] Inventor: Nigel Hughes, Manchester, England

[73] Assignee: Imperial Chemical Industries Limited, London, England

[22] Filed: Dec. 27, 1971

[21] Appl. No.: 212,634

[30] Foreign Application Priority Data
Jan. 4, 1971  Great Britain.................. 292/71

[52] U.S. Cl..................... 260/156, 8/41 R, 8/41 A, 8/41 B, 8/50, 8/92, 260/154
[51] Int. Cl...................... C09b 29/36, D06p 3/70
[58] Field of Search..................... 260/156, 296 R

[56] References Cited
UNITED STATES PATENTS

| | | | |
|---|---|---|---|
| 1,887,772 | 11/1932 | Martin et al. | 260/570.9 |
| 2,263,387 | 11/1941 | Houk et al. | 260/570.9 X |
| 2,431,190 | 11/1947 | Morgan | 260/156 X |
| 2,505,133 | 4/1950 | Miescher et al. | 260/570.9 X |
| 2,512,732 | 6/1950 | Aeschlimann et al. | 260/296 R |
| 2,573,606 | 10/1951 | Rieveschl et al. | 260/570.9 |
| 2,608,584 | 8/1952 | Spruzes et al. | 260/570.9 |
| 2,860,141 | 11/1958 | Larrabee | 260/156 X |
| 2,951,078 | 8/1960 | Biel | 260/296 R X |
| 3,487,066 | 12/1969 | Ritter et al. | 260/156 |
| 3,640,674 | 2/1972 | Berrie et al. | 260/156 X |
| 3,657,214 | 4/1972 | Berrie et al. | 260/156 |
| 3,664,996 | 5/1972 | Berrie et al. | 260/156 |

OTHER PUBLICATIONS

Ettel et al., Chemical Abstracts, Vol. 45, 3847, (1951).
Wagner et al., "Synthetic Organic Chemistry," pages 666 to 670, (1953).
Kuhn et al., Ber. Deut. Chem. Gesell., Vol. 70, pages 567 to 569, (1937).
Smirnov et al., Chemical Abstracts, Vol. 62, 11,774, (1965).

Primary Examiner—Floyd D. Higel
Attorney, Agent, or Firm—Cushman, Darby & Cushman

[57] ABSTRACT

A water-soluble salt of a 3-tertiary amino-5-azo-6-hydroxypyrid-2-one of the formula

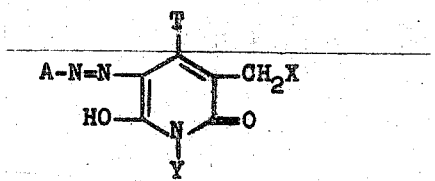

wherein A is phenyl, napthyl or phenyl substituted with one or two substituents selected from nitro, methyl, methoxy, halogen, acetamido, sulphonamido, phenylazo and tolyazo, T is methyl, ethyl, propyl, phenyl or tolyl, Y is hydrogen, methyl, ethyl, propyl, hydroxyethyl, methoxypropyl, napthyl, phenyl, or phenyl substituted with nitro, chloro, methyl, or methoxy and X is amino of the formula $-NR^1R^2$ wherein $R^1$ and $R^2$ are methyl, ethyl, propyl, hydroxyethyl or cyanoethyl or together with the nitrogen to which they are attached form a piperidino, morpholino, thiomorpholino, hexahydroazepino or 2-methylpyrrolidino ring. The dyestuff is prepared by reacting the 3-halogen derivative or said dyestuff with a secondary amine of the formula $NHR^1R^2$ wherein $R^1$ and $R^2$ are defined above and forming the salt of the resulting product with an inorganic or organic acid. The dyestuff is used to dye polymeric materials, particularly polyacrylonitrile distinguished by good wet and light fastness and build up properties.

3 Claims, No Drawings

3-SECONDARY AMINOMETHYLENE-4-LOWER-ALKYL-5-AZO-6-HYDROXYPYRID-2-ONE DYESTUFFS

This invention relates to new azo dyestuffs which are valuable for the coloration of polymeric materials in the form of fibres, film, threads or tapes and particularly of polymeric materials consisting of polyesters, polyamides, cellulose esters or polymers or copolymers of acrylonitrile or dicyanoethylene.

According to the invention there are provided new azo dyestuffs free from sulphonic or carboxylic acid groups of the formula:

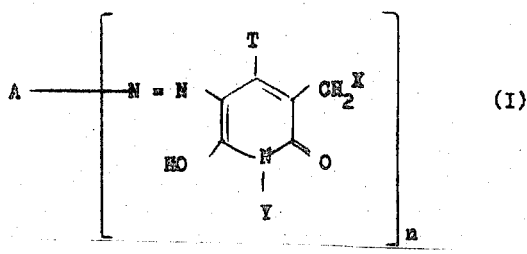

wherein A is an aromatic radical, X is a tertiary amino group, Y is a hydrogen atom or an optionally substituted alkyl, alkenyl, aralkyl, cycloalkyl or aryl radical, T is a lower alkyl or aryl groups and $n$ is 1 or 2, and salts thereof.

The azo dyestuffs of the invention can exist in a number of tautomeric forms; for convenience the dyestuffs have only been formulated in one of these tautomeric forms, but it is to be understood that this Specification includes within its scope the dyestuffs in any of the possible tautomeric forms.

The aromatic radical which is represented by A may be any aromatic carbocyclic or heterocyclic radical which may carry substituents such as alkyl, cycloalkyl or aralkyl, alkoxy, aralkoxy, aryl, carbalkoxy, acyloxy, aryloxy, naphthylazo, acylamino, aryloxy, arylamino, carbamoyl, sulphamyl, alkylsulphonyl, alkylmercapto, aralkylmercapto, dialkylamino and substituted derivatives of the foregoing, nitro, cyano, trifluoromethyl and halogeno groups.

A is preferably a radical of the benzene, naphthalene, or hetercyclic class, especially suitable substituents being Cl, Br, $CF_3$, CN, $NO_2$, $-NH-CO-CH_3$, OH, $-NH-CO-CH_2-Cl$, $-SO_2-NH_2$, $-SO_2-NH-CH_3$, $-SO_2-NH-C_2H_5$, $-SO_2-N-(C_2H_5)_2$, $-SO_2-N-(CH_3)_2$, $-SO_2-NH-Ph$, $-CO-NH_2$, $-CO-NH-C_2H_5$, $CH_3-O-$, $C_2H_5-O-$, $-SO_2CH_3$, $-SO_2-C_2H_5$, $-SO_2-Ph$, $-O-CH_2-CH_2-OH$, $-O-CH_2-CH_2-Cl$, $-O-CH_2-CH_2-O-CH_3$, $-CO-O-CH_3$, $-CO-O-$cyclohexyl, $-NH$-cyclohexyl, $-NH-Ph$, $-Ph$, $-O-Ph$, $-CH_2-Ph$ and $-S-Ph$.

Especially valuable dyestuffs are obtained when A is an optionally substituted o-nitroaryl radical, particularly o-nitrophenyl, which afford colorations of superior light fasteness.

The tertiary amino group represented by X will be of the formula $-NR^1R^2$ wherein $R^1$ is an alkyl, alkenyl, aralkyl, or cycloalkyl group or substituted derivative thereof and $R^2$ is a group of the type represented by $R^1$ or an aryl substituted aryl group or, alternatively the groups $R^1$ and $R^2$ together with the nitrogen atom form a heterocyclic ring.

As groups which may be represented by $R^1$ or $R^2$ there are mentioned alkyl groups, for example methyl, ethyl, isopropyl and tert.-butyl, substituted alkyl groups, for example α-hydroxyethyl, β-cyanoethyl and γ-methoxy propyl, alkenyl groups for example allyl, cycloalkyl groups for example cyclopentyl and cyclohexyl, substituted cycloalkyl groups for example chlorocyclohexyl and methoxycyclohexyl, aralkyl groups for example benzyl and β-phenylethyl, and substituted aralkyl groups for example p-nitrobenzyl, p-methoxybenzyl and β-(4-chlorophenyl)ethyl.

As optionally substituted aryl groups which may be represented by $R^2$ there are mentioned phenyl, o-, m- and p-tolyl, o-, m- and p-chlorphenyl and p-methoxyphenyl.

As heterocyclic groups which may be formed by $R^1$, $R^2$ and the nitrogen atom there are mentioned for example especially piperidino but also morpholino, pyrrolidino, thiamorpholino, piperazino and hexahydroazepino.

The optionally substituted alkyl radicals represented by Y are preferably optionally substituted lower alkyl radicals, by which is meant alkyl radicals containing not more than 4 carbon atoms and their substituted derivatives, and as specific examples of such radicals there may be mentioned particularly ethyl but also methyl, n-propyl, and n-butyl, hydroxy lower alkyl such as β-hydroxyethyl, lower alkoxy lower alkyl such as β-(methoxy or ethoxy) ethyl, cyanomethyl, carbamoylmethyl, carbethoxymethyl and acetylmethyl.

As examples of optionally substituted alkenyl, aralkyl, and cycloalkyl radicals which may be represented by Y, there are mentioned the groups of this type which may be represented by $R^1$ and $R^2$. As examples of optionally substituted aryl groups which may be represented by Y there are mentioned phenyl, o-, m- and p-tolyl, o-, m- and p-chlorophenyl, p-methoxyphenyl, 1-naphthyl, p-sulphondimethylamidophenyl, o-, m- and p-nitrophenyl, p-acetamidophenyl, p-acetylphenyl and m-alkyl (or aryl) sulphonylphenyl.

As lower alkyl groups which are represented by T there are mentioned alkyl groups containing not more than 4 carbon atoms, especially the methyl group.

As aryl groups which may be represented by T there are mentioned for example phenyl and o-, m- and p-tolyl groups, $n$ is preferably 1.

As salts of the azo dyestuffs there are mentioned for example salts with inorganic acids, such as hydrochloric acid, sulphuric acid, phosphoric sulphamic and boric acid, and with organic acids such as formic acid, acetic acid, propionic acid, citric acid, oxalic acid, and mono, di and trichloracetic acids.

These salts may be obtained in aqueous solution by dissolution of the amine in water and an equivalent quantity of the acid and may be isolated by evaporation of the aqueous solution, or by salting out the dye from the aqueous solution. In some cases the dyes is isolated as its tetrachlorozincate by addition of salt and zinc chloride to its aqueous solution.

Alternatively, the dye free base may be ground with a solid water-soluble acid such as sulphamic or citric acid and then pasted with a little aqueous acetic or propionic acid to give a water-soluble dyestuff.

According to the invention there is also provided a process for the preparation of dyestuffs of the formula I which comprises reacting a halogenomethyl compound of the formula

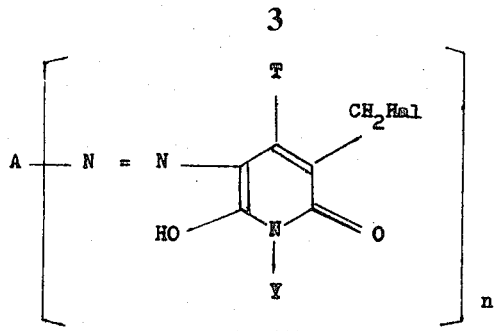

(II)

wherein A, T, Y and n have the meanings given hereinbefore and Hal is a chlorine or bromine atom with a secondary amine of the formula $NHR^1R^2$ wherein $R^1$ and $R^2$ have the meanings given hereinbefore.

The process of the invention may be carried out by heating together equivalent quantities of the halogenomethyl compound and the secondary amine in a suitable inert solvent or in an excess of the secondary amine as solvent followed by isolation of the tertiary amine by conventional methods.

As examples of secondary amines there are mentioned alkylamines such as dimethylamine, diethylamine, di isopropylamine, substituted alkylamines such as diethanolamine, di-($\alpha$-methoxypropyl) amine and N-methyl benzylamine, aromatic amines such as N-methyl aniline and N-phenyl benzylamine and heterocyclic amines such as pyrrolidine, piperidine, morpholine, thiamorpholine, hexamethyleneimine, and piperazine.

The compounds of the Formula II used in the process of the invention are themselves novel and may be prepared by halogenomethylation of an azohydroxypyridone of the formula

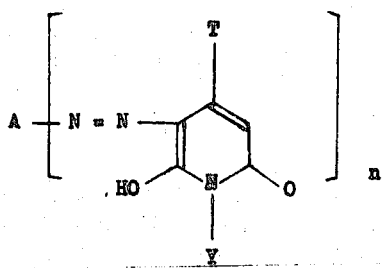

(III)

wherein A, T, Y and n have the meanings given hereinbefore.

The halogenomethylation may be carried out by any conventional procedure for this type of reaction, for example the azohydroxypyridone may be heated in a suitable solvent such as dioxane, chlorobenzene or an alcohol, with formaldehyde and hydrochloric acid.

Alternatively the azo pyridone compound may be treated with paraformaldehyde in a mixture of sulphuric and chlorosulphuric acids or with paraformaldehyde and sodium chloride in concentrated sulphuric acid or with sym.-dichlorodimethyl-ether in concentrated sulphuric acid. These reactions are preferably carried out at a temperature of between 0° and 100°C.

There is also provided an alternative process for the preparation of dyestuffs of the formula I which comprises reacting a compound of the formula III with formaldehyde or a formaldehyde generator and a secondary amine of the formula $NHR^1$, $R^2$, wherein A, T, Y, n, $R^1$ and $R^2$ have the meanings given hereinbefore.

The alternative process may be carried out under conventional conditions for this type of reaction (the Mannich reaction), for example the compound of formula III may be heated with a secondary amine of the formula $NHR^1R^2$ and with paraformaldehyde in an inert solvent such as dioxane, methanol, ethanol, isopropanol, toluene, ethylene glycol, acetic acid, and especially halogenated aromatic hydrocarbon such as chlorobenzene, o-dichlorobenzene, and bromobenzene and halogenated aliphatic compounds such as ethylene dichloride and propylene dichloride. The dyestuff so produced may then be isolated by precipitation with water followed by filtration or other conventional methods.

The azohydroxypyridones are obtained by diazotizing an amine of the formula $A(NH_2)_n$ and coupling the diazonium compound with the corresponding hydroxypyridone. Examples of suitable amines include aniline, o-, m- or p-toluidine, o-, m- or p-anisidine, o-, m-, or p-chloroaniline, o-, m- or p-bromoaniline, o-, m- or p-nitroaniline, 2,5-dichloroaniline, 2,4-dinitroaniline, 2,4-dinitro-6-(chloro or bromo)aniline, 4-methanesulphonylaniline, 4-aminobenzotrifluoride, 4- or 5-nitro-2-toluidine, 4- or 5-nitro-2-anisidine, 4- or 5-bromo-2-anisidine, 2,6-di(chloro- or bromo-)-4-nitroaniline, 2,4,6-trinitroaniline, 2,4-dinitro-6-carbomethoxyaniline, 2-amino-5-nitrobenzotrifluoride, 2,4-bis(methane-sulphonyl) aniline, 2-(chloro- or bromo-)-4-nitroaniline, methylanthranilate, 4- or 5-nitromethylanthranilate, 4-amino-benzamide, 2,6-di(chloro- or bromo-)aniline-4-sulphonamide, 2,6-di(chloro- or bromo-)-4-methylsulphonylaniline, 2,5-di-(chloro- or bromo-) -4,6-dinitroaniline, 2-amino-3,5-dinitrobenzotrifluoride, 3-amino-2-(chloro- or bromo-)-4,6-dinitro-(toluene or anisole), 3-amino-4-(chloro- or bromo-)-2,6-dinitro-(toluene or anisole), 2- or 4-cyanoaniline, 4-nitro-2-cyanoaniline, 2,4-dinitro-6-cyanoaniline, 2-nitro-4-cyano aniline, 2-chloro-4-cyanoaniline, 3-amino-2,4,6-trinitrotoluene, 2-(chloro- or bromo-)-4-methylsulphonylaniline, 3-(chloro- or bromo-) -4-thiocyanatoaniline, 2-(chloro- or bromo-)-4-sulphamylaniline, 2-amino-5-nitrophenylmethanesulphone, 2-amino-3,5-dinitrophenylmethylsulphone, 2-amino-3-(chloro- or bromo-)-5-nitrophenylmethylsulphone, 2-sulphamyl-4-nitroaniline, 2-methylsulphamyl-4-nitroaniline, 2-ethylsulphamyl-4-nitroaniline, 2-butylsulphamyl-4-nitroaniline, 2-dimethylsulphamyl-4-nitroaniline, 2-methylsulphamyl-4,6-dinitroaniline, 2-methylsulphamyl-4-nitro-6-(chloro- or bromo-) aniline, 2-phenylsulphamyl-4-nitroaniline, methyl 2-amino-3-(chloro- or bromo-)-5-nitrobenzoate, dimethyl 2-aminoterephthalate, dimethyl 2-amino-5-nitroterephthalate, aniline -2-, 3- or 4- sulphamate, aniline-2-, 3- or 4-N,N-dimethylsulphamate, 4-aminobenzenesulphonamide, 2-nitro-4-methylaniline, 2-cyano-4-methylaniline, 4-chloro-2-methylaniline, 2-aminothiazole, 2-amino-6-methoxybenzthiazole, 2-amino-6-methylsulphonyl benzthiazole, 2-amino-6-nitrobenzthiazole, 2-aminobenzthiazole, 2,5-dimethoxyaniline, 2-amino-5-nitrothiazole, 2-amino-4-methyl-5-nitrothiazole, 2-amino-4m-nitrophenyl-5-nitrothiazole, 3-methyl-5-amino-1,2,4-thiadiazole, 3-methylsulphonyl-5-amino-1,2,4-thiadiazole, 3-methylmercapto-5-amino-1,2,4-thiadiazole, 3-phenyl-5-amino-1,2,4-thiadiazole, 2-amino-1,3,4-thiadiazole, 2-amino-5-nitro-1,3,4-thiadiazole, 4-aminobenzene-(2,5- or 3,5-dichloro)benzenesulphon-, N-dimethylamide, 4-amino-3-chlorobenzenesulphon-N,N-dimethylamide, 5-chloro-2,4-bis-(N,N-dimethylaminosulphonyl)aniline, 2-chloro-5-cyano-aniline, 2-cyano-5-chloroaniline, 2,4-dicyanoaniline, 4-amino diphenylamine, 4-aminodiphenylmethane, 4-aminodiphenylsulphone, 4-aminobenzene, 4-phenylazo-1-aminoaphthalene, 2-aminobenzenesulphon-N,N-dimethylamide, 2-trifluoromethylaniline, 2- or 4-aminobenzonitrile, 2-aminophenylmethyl or ethyl sulphone, 4-chloro-2-trifluoromethylaniline, and 4-phenylazo-1-aminobenzene, 4-2'-methylphenylazo-2-methyl-1-aminobenzene, 4-phenylazo-2-chloro-1-aminobenzene, 4-4'-methylphenylazo-1-aminobenzene, 4-(2',4'-dinitrophenylamino)-1-aminobenzene, 4-(2'-nitrophenylamino)-1-aminobenzene, 1-aminonaphthalene, and 6-methyl-2-(4'-aminophenyl)benzthiazole.

The azo dyestuff salts of the invention are valuable for obtaining colorations which are stronger in shade than those obtained using known cationic dyestuffs in polymeric materials particularly in the form of textile materials especially those containing polymers and copolymers of acrylonitrile and of dicyanoethylene and polyester, polyamides and cellulose esters. The polymeric materials may be modified, for example acid-modified. The dyestuff free base, when ground with a solid water-soluble carboxylic acid, may be pasted with aqueous acetic acid and dissolved in water giving an aqueous solution suitable for use in dyeing. Alternatively the dye free base may be dissolved in a suitable solvent, preferably an aqueous organic carboxylic acid, which may optionally contain a further solvent, giving a concentrated liquid formulation which does not form a sediment or crystallize on low-temperature storage.

These dyestuff salts of the invention may be applied to polyamide, cellulose ester, or particularly polyacrylontrile or polydicyanoethylene materials from acid, or neutral dyebaths (i.e. pH from 3 to 7) at tempertures between 40 and 120°C and preferably between 80 and 120°C or by printing techniques using thickened print pastes.

On polyacrylonitrile textile materials, especially when the polyacrylonitrile has been modified to contain acidic groups, bright shades are obtained which are distinguished by their good wet and light fastness and build up properties.

These dyestuffs are particularly valuable for coloration, preferably from neutral dyebaths, of polyamide and polyester polymeric materials which are modified to contain acidic groups.

The azo dyestuffs of the invention are also valuable as dyestuffs and may be applied from aqueous dispersion to polyamide, cellulose acetate and triacetate and polyester fibres.

The invention is illustrated but not limited by the following Examples in which all parts and percentages are by weight unless otherwise specified.

EXAMPLE 1

A mixture of 6.04 parts of 1-ethyl-4-methyl-5-(2-nitrophenylazo)-6-hydroxypyrid-2-one, 50 parts of dioxane, 3 parts of paraformaldehyde and 8.5 parts of piperidine is heated at the boiling point for 18 hours. The solution is poured into 400 parts of water and the precipitated Mannich Base having the formula

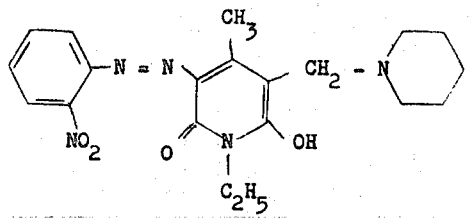

and melting at 158°C is collected by filtration, washed with water and dried.

1 part of the dyestuff prepared as described above is dissolved in a mixture of 5 parts of water and 0.6 parts of acetic acid and the solution is diluted with 3000 parts of water. 100 parts of polyacrylonitrile fibre as immersed in the solution and the temperature is raised slowly to 100°C and dyeing continued at this temperature for 90 minutes.

The resulting dyeing, greenish-yellow in shade, has excellent fastness to light, washing and heat treatment.

EXAMPLE 2

In place of the 8.5 parts of piperidine used in Example 1 there is used 8.5 parts of morpholine whereby the Mannich base having the formula

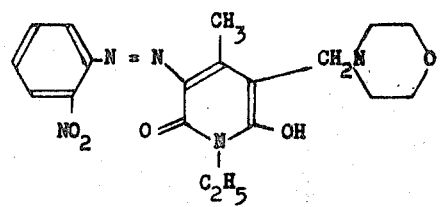

and melting at 196°C is obtained.

The dyestuff yields greenish-yellow dyeing having excellent fastness to light, washing and heat treatments, when applied to polyacrylonitrile fibres from an aqueous acetic acid dyebath.

The following examples were prepared in a similar manner:

| EXAMPLE | A | T | V | X | SHADE |
|---|---|---|---|---|---|
| 3 | 3-nitrophenyl | $CH_3$ | $C_2H_5$ | piperidino | greenish-yellow |
| 4 | 2-methoxy-4-nitrophenyl | do. | do. | do. | mid yellow |
| 5 | 4-methoxy-2-nitrophenyl | do. | do. | do. | yellowish-orange |
| 6 | 4-methyl-2-nitrophenyl | do. | do. | do. | mid yellow |
| 7 | phenyl | do. | do. | do. | greenish-yellow |
| 8 | 2-methylphenyl | do. | do. | do. | mid yellow |
| 9 | 3-methylphenyl | do. | do. | do. | do. |
| 10 | 4-methylphenyl | do. | do. | do. | do. |
| 11 | 2-methoxyphenyl | $CH_3$ | $C_2H_5$ | piperidino | mid yellow |

| EXAMPLE | A | T | V | X | SHADE |
|---|---|---|---|---|---|
| 12 | 4-methoxyphenyl | do. | do. | do. | do. |
| 13 | 4-acetylaminophenyl | do. | do. | do. | do. |
| 14 | 2-chlorophenyl | do. | do. | do. | greenish-yellow |
| 15 | 4-chlorophenyl | do. | do. | do. | do. |
| 16 | 4-nitrophenyl | do. | do. | do. | do. |
| 17 | 2-nitro-4-chlorophenyl | do. | do. | do. | do. |
| 18 | 2-chloro-4-nitrophenyl | do. | do. | do. | do. |
| 19 | 2-bromo-4-nitrophenyl | do. | do. | do. | do. |
| 20 | 3-chlorophenyl | $C_2H_5$ | do. | do. | do. |
| 21 | 4-sulphonamidophenyl | $CH_3$ | do. | do. | do. |
| 22 | 2-nitrophenyl | do. | $C_2H_4OH$ | do. | do. |
| 23 | do. | do. | $C_3H_6OCH_3$ | do. | do. |
| 24 | do. | do. | $CH_3$ | do. | do. |
| 25 | do. | do. | H | do. | do. |
| 26 | do. | do. | p-tolyl | do. | do. |
| 27 | 2-nitrophenyl | $CH_3$ | $C_3H_7$ | do. | do. |
| 28 | do. | do. | o-tolyl | do. | do. |
| 29 | do. | do. | p-methoxyphenyl | do. | do. |
| 30 | do. | do. | p-nitrophenyl | do. | do. |
| 31 | do. | do. | 1-naphthyl | do. | do. |
| 32 | 4-methoxy-nitrophenyl | do. | $C_2H_5$ | morpholino | reddish-yellow |
| 33 | do. | do. | do. | thio-morpholino | do. |
| 34 | 4-methoxy-2-nitrophenyl | $CH_3$ | $C_2H_5$ | $-N(CH_3)_2$ | reddish-yellow |
| 35 | do. | do. | do. | $-N(CH_3)-C_2H_4CN$ | do. |
| 36 | do. | do. | do. | $-N(CH_3)-C_2H_4OH$ | do. |
| 37 | do. | do. | do. | $-N(C_2H_4OH)_2$ | do. |
| 38 | 2-nitrophenyl | do. | do. | hexahydroazepino | greenish-yellow |
| 39 | do. | do. | do. | $-N(C_2H_4OH)_2$ | do. |
| 40 | do. | do. | do. | $-N[CH(CH_3)_2]_2$ | do. |
| 41 | do. | do. | do. | 2-methyl-pyrrolidino | do. |
| 42 | do. | $C_2H_5$ | $CH_3$ | piperidino | do. |
| 43 | do. | $C_3H_7$ | do. | do. | do. |

EXAMPLE 44

2.5 Parts of a dyestuff of formula:

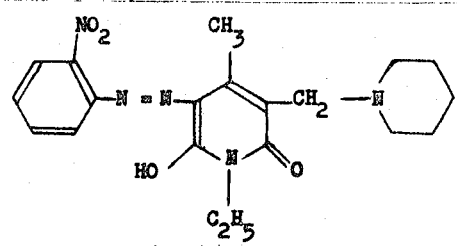

are added with stirring to a mixture of 5 parts of acetic acid and 5 parts of water, and the mixture stirred for 20 minutes at room temperature. A mobile yellow-liquid, stable on low temperature storage is obtained.

A similar procedure using the dyestuffs listed below gives colored polyacrylontrile fabrics of the shade indicated.

| EXAMPLE | A | T | Y | X | SHADE |
|---|---|---|---|---|---|
| 45 | 4-methoxy-2-nitrophenyl | $CH_3$ | $C_2H_5$ | Piperidino | reddish-yellow |
| 46 | phenyl | do. | do. | do. | greenish-yellow |
| 47 | 4-methylphenyl | do. | do. | do. | mid-yellow |
| 48 | 2-methylphenyl | do. | do. | do. | do. |
| 49 | 4-methoxyphenyl | do. | do. | do. | do. |
| 50 | 2-methoxyphenyl | do. | do. | do. | do. |
| 51 | 4-acetylaminophenyl | do. | do. | do. | do. |
| 52 | 4-sulphonamidophenyl | do. | do. | do. | greenish-yellow |
| 53 | 4-(phenylazo)phenyl | do. | do. | do. | reddish-yellow |
| 54 | 4-(2'-methylphenylazo)-2-methylphenyl | do. | do. | do. | yellow-orange |
| 55 | 1'-naphthyl- | do. | do. | do. | orange |
| 56 | 4-(2',4'-dinitrophenyl)aminophenyl | do. | do. | do. | reddish-yellow |
| 57 | 2-nitrophenyl | do. | do. | morpholino | Greenish-yellow |

EXAMPLE 58

9.06 parts of a dyestuff of formula:

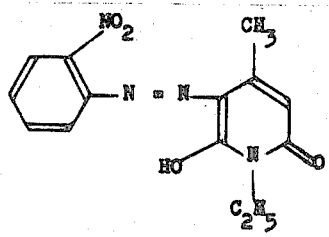

are suspended in 25 parts of chlorobenzene, and 4.5 parts of paraformaldehyde and 13 parts of piperidine added. The resulting mixture is heated at 95 – 100° for 18 hours, and the chlorobenzene removed by steam-distillation. The residual aqueous suspension is acidified with 3 parts of sulphuric acid, forming a clear solution. The solution of the dyestuff sulphate is then treated with 6.8 parts of sodium acetate and 6 parts of 'Hyflo Spercel' at 70°, screened hot and the filtrate basified with aqueous ammonia. 9 Parts are obtained of a dyestuff of formula:

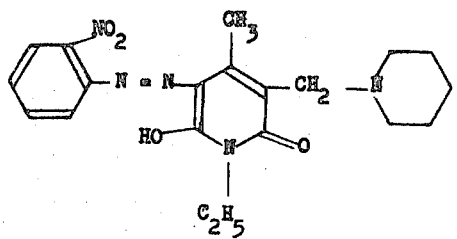

1 Part of the above dyestuff is ground with 0.25 parts of sulphamic acid and pasted with 1.3 parts of 30% aqueous acetic acid, and the resulting fluid mixture dissolved in 200 parts of water giving a 0.5% aqueous solution which can be used to dye polyacrylontrile by the application method described in Example 1.

This dye produces similar shades on polyacrylontrile to the dyestuff of Example 1.

Other dyestuffs of the invention, prepared by the method used in Example 58 are listed as follows:

| EX. | A | T | Y | X | SHADE |
|---|---|---|---|---|---|
| 59 | 4-methoxy-2-nitrophenyl | CH$_3$ | C$_2$H$_5$ | piperidino | reddish-yellow |
| 60 | 2-nitrophenyl | do. | phenyl | do. | greenish-yellow |
| 61 | do. | do. | p-chlorophenyl | do. | do. |
| 62 | 4-(phenylazo)phenyl | do. | C$_2$H$_5$ | do. | reddish-yellow |
| 63 | 4 (2'-methylphenylazo)-2-methylphenyl | do. | do. | do. | do. |
| 64 | 4-(phenylazo)-2-chlorophenyl | do. | do. | do. | do. |
| 65 | 4-(4'-methylphenylazo)-phenyl | do. | do. | do. | do. |
| 66 | 4-(2',4'-dinitrophenyl-amino)phenyl | do. | do. | do. | do. |
| 67 | 4-(2'-nitrophenylamino)-phenyl | do. | do. | do. | do. |
| 68 | 1'-naphthyl | do. | do. | do. | do. |
| 69 | 6-methyl-2-(4'-amino phenyl)benzthiazole | do. | do. | do. | yellow |
| 70 | 2-nitrophenyl | phenyl | do. | do. | do. |

EXAMPLE 71

2.5 Parts of the dyestuff described in Example 1 are added to a stirring mixture of 1 part of acetic acid and 9 parts of water, and the mixture stirred for 20 minutes at room temperature. A stable mobile concentrated liquid similar to that obtained in Example 44 is formed.

EXAMPLE 72

2.5 Parts of the dyestuff described in Example 1 are added to a stirring mixture of 1 part of acetic acid, 1 part of methanol and 8 parts of water, and the solution stirred for 20 minutes at room temperature. A mobile yellow liquid, stable on low temperature storage, is obtained.

EXAMPLE 73

By replacing the methanol in Example 72 by 1 part of ethanol, a similar mobile concentrated liquid formulation is obtained.

EXAMPLE 74

By replacing the methanol in Example 72 by 1 part of isopropanol, a similar concentrated liquid composition is obtained.

We claim:

1. A water soluble salt of an azo dyestuff free from sulphonic or carboxylic acid group of the formula:

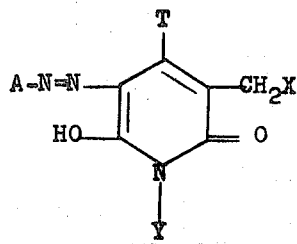

wherein

A is 2-nitrophenyl, 3-nitrophenyl, 4-nitrophenyl, 2-methoxy-4-nitrophenyl, 4-methoxy-2-nitrophenyl, 4-methyl-2-nitrophenyl, phenyl, 2-methylphenyl, 3-methylphenyl, 4-methylphenyl, 2-methoxyphenyl, 4-methoxyphenyl, 4-acetylaminophenyl, 2-chlorophenyl, 3-chlorophenyl, 4-chlorophenyl, 2-nitro-4-chlorophenyl, 2-chloro-4-nitrophenyl, 2-bromo-4-nitrophenyl, 4-sulphonamidophenyl, 4-(phenylazo)phenyl, 4-(2'-methylphenylazo)-2-methylphenyl, 1'-naphthyl-, 4-(2',4'-dinitrophenyl)aminophenyl, 4-(phenylazo)-2-chlorophenyl, 4-(4'-methylphenylazo)-phenyl, 4-(2'-nitrophenylamino) phenyl, or 6-methyl-2-(4'-aminophenyl) benzthiazole;

T is methyl, ethyl, propyl or phenyl;

Y is hydrogen, methyl, ethyl, propyl, hydroxyethyl, methoxypropyl, 1-naphthyl, phenyl, p-tolyl, o-tolyl, p-methoxyphenyl, p-nitrophenyl, or p-chlorophenyl; and X is amino of the formula —NR$^1$R$^2$ wherein R$^1$ and R$^2$ each independently are methyl, ethyl, propyl, hydroxyethyl or cyanoethyl, or together with the nitrogen atom to which they are attached form a hetercycle selected from piperidino, morpholino, thiomorpholino, hexahydroazepino and 2-methylpyrrolidino, with an acid selected from the group consisting of hydrochloric, sulphuric, phosphoric, sulphamic, boric, formic, acetic, propionic, citric, oxalic, and mono-, di- and trichloroacetic acids.

2. The dyestuff of claim 1 wherein A is ortho-nitrophenyl.

3. The dyestuff of claim 1 wherein X is piperidino.

* * * * *